US009874874B2

(12) United States Patent
Bernhardt et al.

(10) Patent No.: US 9,874,874 B2
(45) Date of Patent: Jan. 23, 2018

(54) DYNAMIC COMPLIANCE MONITORING OF UNMANNED VEHICLES

(71) Applicants: Jonathan Bernhardt, Escondido, CA (US); Russell Common, Valley Center, CA (US); David B. Campbell, Ramona, CA (US)

(72) Inventors: Jonathan Bernhardt, Escondido, CA (US); Russell Common, Valley Center, CA (US); David B. Campbell, Ramona, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/150,108

(22) Filed: May 9, 2016

(65) Prior Publication Data

US 2016/0378113 A1 Dec. 29, 2016

Related U.S. Application Data

(60) Provisional application No. 62/168,400, filed on May 29, 2015.

(51) Int. Cl.
*G05D 1/00* (2006.01)
*G08G 5/00* (2006.01)
*G07C 5/08* (2006.01)
*B64C 39/02* (2006.01)
*G01C 21/16* (2006.01)

(52) U.S. Cl.
CPC ......... *G05D 1/0055* (2013.01); *B64C 39/024* (2013.01); *G01C 21/16* (2013.01); *G07C 5/0808* (2013.01); *G07C 5/0841* (2013.01); *G08G 5/003* (2013.01); *G08G 5/0069* (2013.01); *B64C 2201/14* (2013.01)

(58) Field of Classification Search
CPC ... B64C 2201/14; B64C 39/024; G01C 21/16; G05D 1/0055; G07C 5/0808; G07C 5/0841; G08G 5/003; G08G 5/0069
USPC .................................................. 701/3, 11, 23
See application file for complete search history.

(56) References Cited

U.S. PATENT DOCUMENTS

| 5,811,738 | A | 9/1998 | Boyovich et al. |
| 9,056,669 | B2 * | 6/2015 | Washington ............ B64C 13/18 |
| 9,412,278 | B1 * | 8/2016 | Gong .................... H04L 63/101 |
| 2003/0120455 | A1 | 6/2003 | Sorrells et al. |

(Continued)

FOREIGN PATENT DOCUMENTS

WO  WO 2013/074843 A1  5/2013

OTHER PUBLICATIONS

International Search Report for corresponding PCT/US2016/031511 dated Jul. 20, 2016.

*Primary Examiner* — Tyler J Lee
(74) *Attorney, Agent, or Firm* — Tarolli, Sundheim, Covell & Tummino LLP

(57) ABSTRACT

A system includes an unmanned vehicle (UV). A compliance unit receives sensor data from one or more sensors and compares the sensor data to a predetermined payload capacity threshold and a predetermined range capability threshold to determine compliance with a predetermined payload capacity and a predetermined range capability of the UV. The compliance unit generates a command to restrict the operation of the UV if the sensor data exceeds the predetermined payload capacity threshold and the predetermined range capability threshold of the UV.

17 Claims, 10 Drawing Sheets

(56) References Cited

U.S. PATENT DOCUMENTS

| | | |
|---|---|---|
| 2005/0271221 A1 | 12/2005 | Cerwin |
| 2011/0035149 A1* | 2/2011 | McAndrew .......... G05D 1/0038 |
| | | 701/466 |
| 2013/0085629 A1 | 4/2013 | Washington et al. |
| 2014/0379173 A1* | 12/2014 | Knapp ................... G06Q 10/10 |
| | | 701/2 |

* cited by examiner

DYNAMIC COMPLIANCE MONITORING OF UNMANNED VEHICLES

CROSS-REFERENCE TO RELATED APPLICATION

This application claims the benefit of U.S. Provisional Patent Application 62/168,400, filed on 29 May 2015, and entitled DYNAMIC COMPLIANCE MONITORING OF UNMANNED VEHICLES, the entirety of which is incorporated by reference herein.

TECHNICAL FIELD

This disclosure relates to navigation control systems, and more particularly to a system and method to dynamically monitor unmanned vehicle performance to facilitate compliance with intended use of the vehicle.

BACKGROUND

An unmanned vehicle (UV) is a vehicle such as a ground vehicle or aircraft capable of operating without a person on board. Unmanned vehicles can either be remote controlled or remote guided vehicles, or they can be autonomous vehicles which are capable of sensing their environment and navigating on their own. Common UV examples include drone aircraft or helicopters that are used for surveillance or military operations, for example. Other types of UVs can include an unmanned ground vehicle (UGV), such as the autonomous car, an unmanned surface vehicle (USV), for the operation on the surface of the water, and an autonomous underwater vehicle (AUV) or unmanned undersea vehicle (UUV), for the operation underwater. These can include an unmanned spacecraft, both remote controlled ("unmanned space mission") and autonomous ("robotic spacecraft" or "space probe"). These UV technologies are often developed by manufacturers in a given country and used by the respective military of the given country. In some cases, license or sales agreements are generated where UVs are exported to other countries. In some specific cases, it may not be desirable for the country receiving the UV to have the same capability as the country that developed the UV.

SUMMARY

This disclosure relates to a system and method to dynamically monitor unmanned vehicle performance to facilitate compliance with intended use of the vehicle. In one aspect, a system includes an unmanned vehicle (UV). A compliance unit receives sensor data from one or more sensors and compares the sensor data to a predetermined payload capacity threshold and a predetermined range capability threshold to determine compliance with a predetermined payload capacity and a predetermined range capability of the UV. The compliance unit generates a command to restrict the operation of the UV if the sensor data exceeds the predetermined payload capacity threshold and the predetermined range capability threshold of the UV.

In another aspect, an unmanned vehicle includes a vehicle management system (VMS) to control operations of the UV. The VMS receives encrypted configuration items that specify threshold data relating to a payload capacity and a range capability of the UV. The threshold data includes a predetermined payload capacity threshold and a predetermined range capability threshold of the UV. A compliance unit controls compliance of the UV to a predetermined payload capacity and a predetermined range capability of the UV. The compliance unit monitors sensor data from one or more sensors and compares the sensor data to a predetermined payload capacity threshold and a predetermined range capability threshold to determine compliance with the predetermined payload capacity and the predetermined range capability of the UV. The compliance unit notifies the VMS to restrict the operation of the UV if the sensor data exceeds the predetermined payload capacity threshold and the predetermined range capability threshold of the UV.

In yet another aspect, a method includes monitoring decrypted sensor data for an unmanned vehicle (UV). The decrypted sensor data includes at least one of fuel sensor data, strain data, air speed data, and engine performance data that indicate a payload capacity and a range capability of the UV. The method includes receiving decrypted configuration items relating to a predetermined range threshold and a predetermined capacity threshold for the UV. The method includes comparing the decrypted sensor data to the predetermined range threshold and the predetermined capacity threshold of the UV to determine if the sensor data exceeds the thresholds. The method includes enabling the UV if the sensor data indicates payload capacity and range capability of the UV that is less than the predetermined thresholds. The method includes disabling the UV if the sensor data indicates payload capacity and range capability of the UV that is greater than or equal to the predetermined thresholds.

DETAILED DESCRIPTION

This disclosure relates to a system and method to dynamically monitor unmanned vehicle (UV) performance to facilitate compliance with intended use of the vehicle. The system includes aircraft (or ground) sensing and launch prevention that includes fuel sensors, strain gauges, transmission sensors, and a compliance unit to dynamically monitor and enforce UV compliance to predetermined performance guidelines. This includes protected sensing which prevents the addition of more than 500 kg (or other predetermined limit) of payload, or prevents a range greater than 300 km (or other predetermined range), for example. The sensing and launch prevention also provides a mechanism thru controller software and/or hardware which can prevent launch if a sensor mechanism is out of specification (e.g., excess payload).

The system includes an unmanned vehicle (UV). The compliance unit dynamically monitors the UV to facilitate compliance with a predetermined minimum payload capacity and a predetermined minimum range capability for the UV. The compliance unit receives data from at least one strain gauge to determine compliance with the predetermined payload capacity and receives data from at least one fuel sensor to determine compliance with the range capability of the UV. The compliance unit can receive the data in an encrypted format from the strain gauge and the fuel sensor to determine compliance. The compliance unit prevents a launch or shuts down the UV (e.g., issues a return to base command to a vehicle management system) if the predetermined payload capacity or the predetermined range capability is exceeded.

Figure 1:
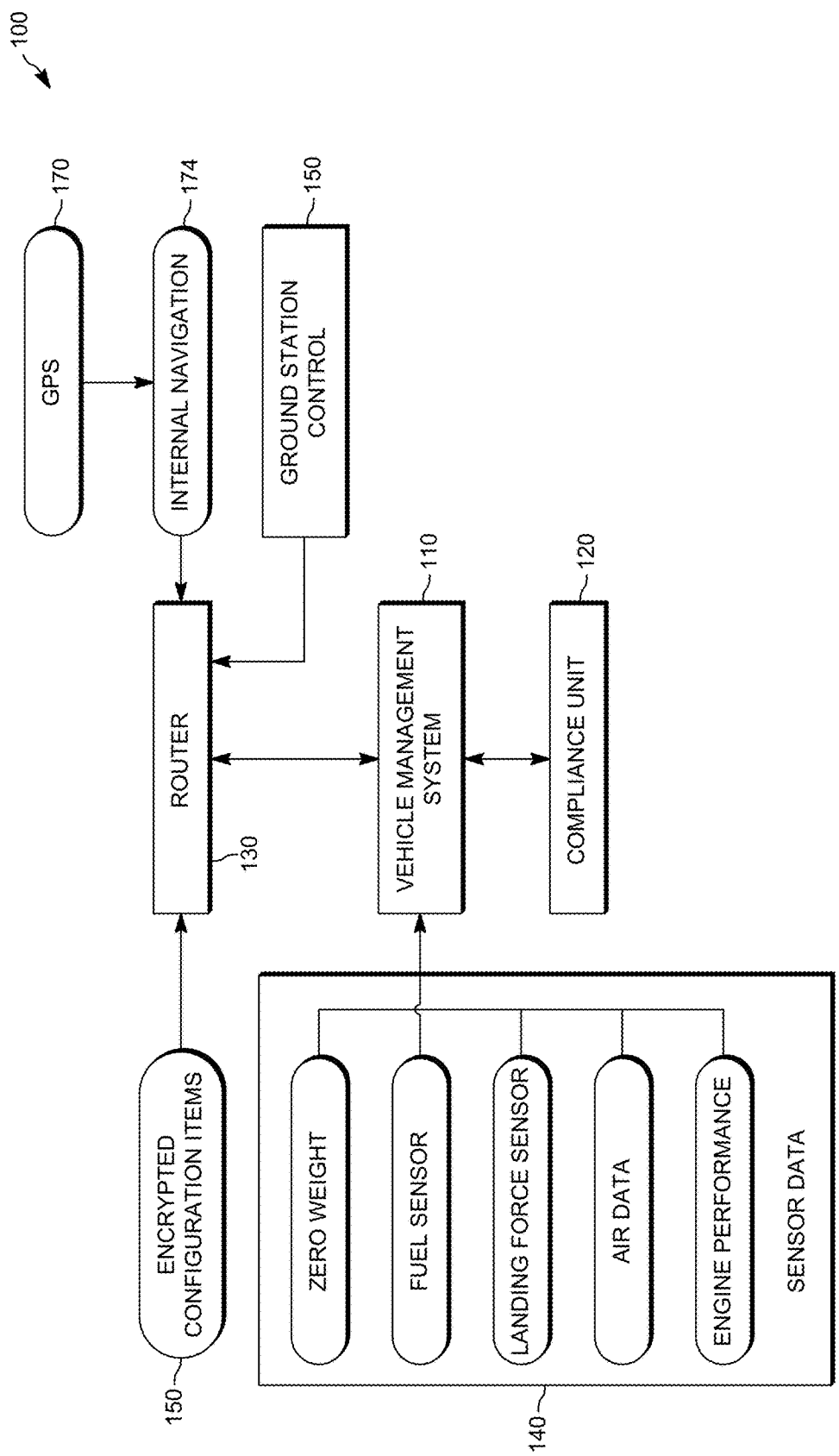
FIG. 1 illustrates an example of a system to dynamically monitor unmanned vehicle performance to facilitate compliance with intended use of the vehicle.

FIG. 1 illustrates an example of a system 100 to dynamically monitor unmanned vehicle (See e.g. vehicle, FIG. 3) performance to facilitate compliance with intended use of the vehicle. The system 100 includes a vehicle management system VMS 110 that operates with a compliance unit 120. The VMS 110 can be connected to a router 130 (e.g., network router), the compliance unit 120, and an array of sensors generating sensor data 140. The sensor data 140 can include zero weight data, fuel sensor data, landing force sensors (e.g., strain gauges), air speed/resistance data, and/or engine performance data. The router 130 receives data from other devices on the network including crypto-hashes at 150, commands from a ground station at 160, and GPS data 170 from an Internal Navigation unit 174. The crypto-hash data 150 can include hardware configuration and software configuration data that is encrypted and employed to compare with sensor data in the compliance unit 120. Substantially all the data described herein including sensor data 140, crypto-hash data 150, and data communicated between the VMS 110 and compliance unit 120 can be encrypted to facilitate that compliance is met and that the system remains in an unaltered state from that commissioned or sold. The compliance unit 120 can include decryption components in order to process encrypted data.

The compliance unit 120 dynamically monitors the UV to facilitate compliance with a predetermined payload capacity and a predetermined range capability of the UV, for example. The compliance unit 120 receives data from at least one strain gauge to determine compliance with the predetermined payload capacity and receives data from at least one fuel sensor to determine compliance with the range capability of the UV. Range and/or location checking can also include analyzing the GPS data 170. The compliance unit 120 can receive the data in an encrypted format from the strain gauge and the fuel sensor to determine compliance, for example. The compliance unit 120 prevents a launch or shuts down the UV. This can include issuing a return to base command to the VMS 110 if the predetermined payload capacity or the predetermined range capability is exceeded (e.g., comparing sensor data compared to configuration item thresholds). In a monitoring example, the compliance unit 120 automatically verifies the configuration of configuration items (e.g., hardware or software) in the larger system against predetermined thresholds and limits. Examples of configuration items monitored include network equipment, bus controllers, engine controls (e.g., Full Authority Digital Electronic Control (FADEC)), a vehicle management system (VMS), a compliance line replaceable unit (LRU), actuators, navigators, along with the aforementioned fuel and strain sensors, for example.

As will be described below with respect to FIG. 2 and method diagrams of FIGS. 4 though 10, various pre-flight and in-flight checking can occur to dynamically determine compliance with predetermined thresholds, guidelines, and/or conditions. These can include system checking that checks cryptographic hash values against expected values before proceeding to a ground check. Ground checking includes checking pre-flight payload capacity with expected payload values, for example. After ground checking, perch checking can include checking that no additional payload was picked up after flight has initiated. In-flight checking can include continuously checking that the payload weight has not been exceeded, for example. Other dynamic checks can include mission checking to determine that the maximum range for the vehicle has not been exceeded and/or location checking that checks whether or not the vehicle is in its predetermined designated air space.

In one example, the VMS 110 directs the UV on a mission in response to an enable command from the compliance unit 120 indicating that the respective capacity and range thresholds are not exceeded. The compliance unit 120 can send a disable command to the VMS 110 to prevent a launch or shut down the UV if the predetermined payload capacity or the predetermined range capability has exceeded the predetermined thresholds. As shown, the router 130 router passes the encrypted configuration items 150 to the VMS 110 that are checked against predetermined thresholds in the compliance unit 120. The router 130 receives global position data 170 from the internal navigation unit 174 that is passed to the compliance unit 120 via the VMS 110 as location data to further check compliance with the predetermined range capability of the UV. The compliance unit 120 can also include a perch check module (See e.g., FIG. 2) to detect whether the predetermined payload capacity has been exceeded during execution of a mission by the UV. The perch check module monitors at least one of air data, engine performance characteristics, and zero weight data to calculate payload weight during the mission to detect whether the predetermined payload capacity has been exceeded during execution of the mission by the UV. For example, the perch check module can detect whether payload has been added during execution of a given mission. As shown, the VMS 110 receives sensor data 140 from at least one of a zero weight sensor, a landing force sensor, an air data sensor, and an engine performance sensor that is passed to the compliance unit 120 to determine whether the predetermined weight and range thresholds are exceeded. The sensor data 140 can be provided in encrypted and/or unencrypted format.

Figure 2:
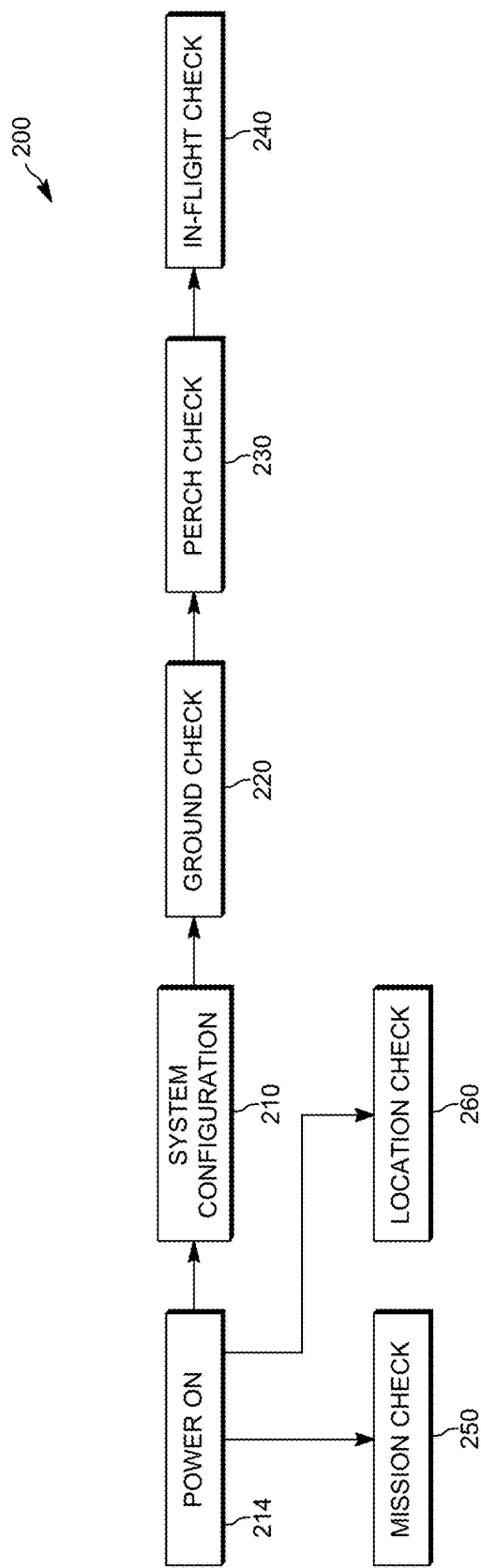
FIG. 2 illustrates examples of modules for dynamic compliance monitoring for an unmanned vehicle.

FIG. 2 illustrates examples of modules for dynamic compliance monitoring for an unmanned vehicle. The respective modules can be executed as hardware components, software components, and/or a combination thereof. Such modules can be executed within or external to the compliance unit described herein. As noted previously, compliance checking is dynamic and continuous in both flight and on ground as sensors send comply/non-comply signals to the controller; where the controller software prevents launch, requires return to base (RTB)/normal shutdown if compliance signal is non-comply. Encryption can be used to prevent hijacking signals or mimicking signals. Pre-launch weight calculations for payload can be made when the launch command is issued and not prior to, in order to prevent configurations from being altered. This involves multiple strain gauges measuring weight in multiple areas and then sending that information to the compliance unit.

As shown, the example checking cases can include system checking at 210 that checks cryptographic hash values after system power on at 214 against expected values before proceeding to a ground check at 220. Ground checking 220 includes checking pre-flight payload capacity with expected payload values, for example. After ground checking 220, perch checking 230 can include checking that no additional payload was picked up after flight has initiated (e.g., via a loop attached to vehicle to pick up additional payload). In flight checking at 240 can include continuously checking that the payload weight has not been exceeded, for example. Other dynamic checks can include mission checking 250 making sure the maximum range for the vehicle has not been exceeded. At 260, location checking can include checking whether or not the vehicle is in its predetermined designated air space, for example. Each of the dynamic compliance checks are described below with respect to the methods depicted in FIGS. 4 though 9.

The aircraft sensing and launch prevention systems described herein can prevent UVs from being capable of carrying more than a restricted payload and can prevent the UV from being capable of flying beyond the restricted distance or designated airspace. The system includes facilitating compliance with US State Department guidelines with respect to Foreign Governments and/or International Suppliers, for example. The aircraft sensing launch prevention system should have substantially high assurance against tamper and subversion and thus encrypted communications are provided to mitigate such subversion or tampering.

Figure 3:
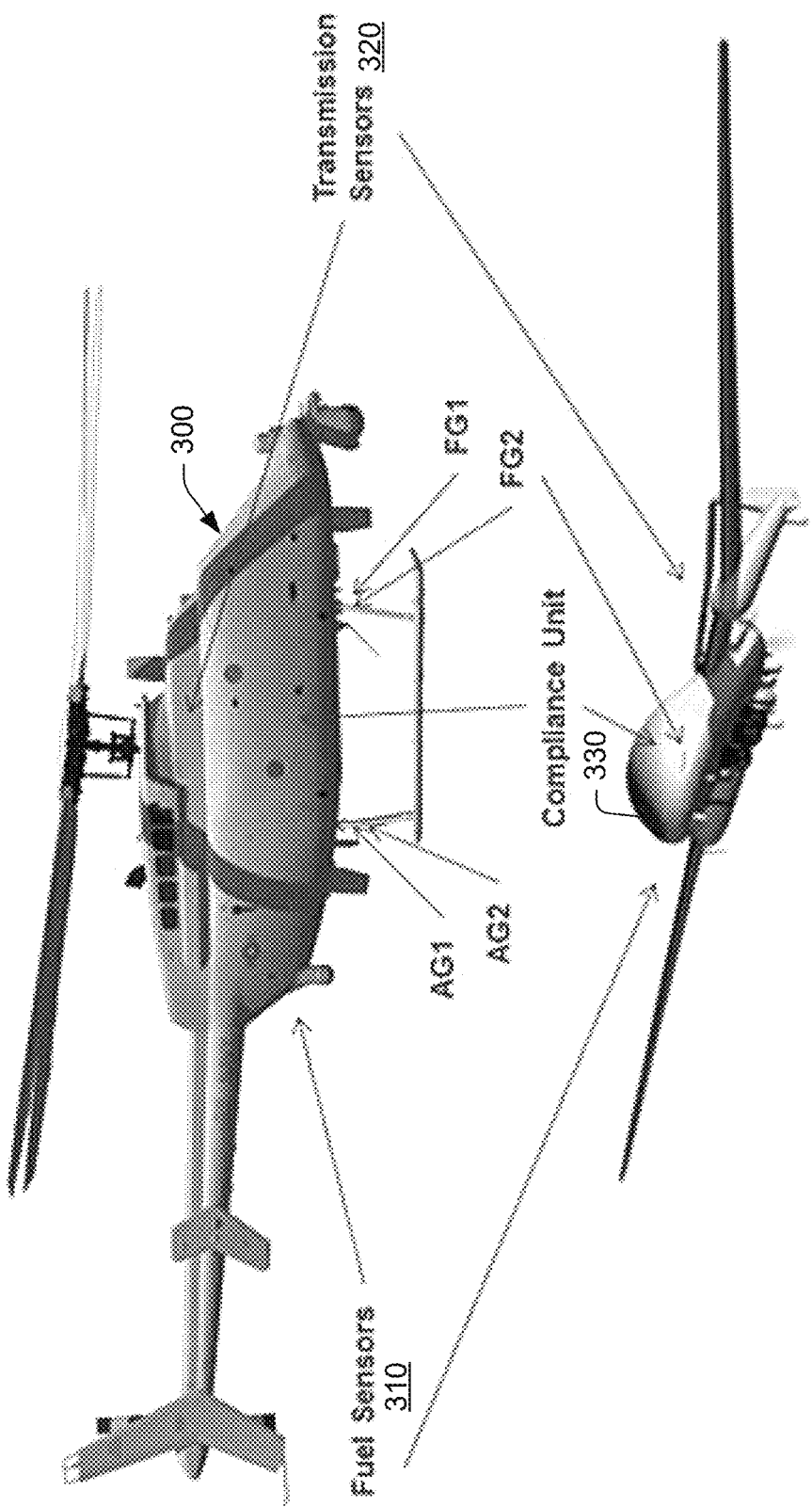
FIG. 3 illustrates an example of an unmanned vehicle having a compliance unit and sensors for monitoring performance.

FIG. 3 illustrates an example of an unmanned vehicle (UV) 300 having a compliance unit 310 and sensors for monitoring performance. The UV 300 includes fuel sensors 310, strain gauges AG1, AG2, FG1, FG2, transmission sensors 320, and a compliance unit 330. The compliance unit 330 provides protected sensing (e.g., encrypted) which prevents the addition of more than 500 kg of payload (or other predetermined amount), or prevents a range greater than 300 km (or other predetermined range), for example. The compliance unit 330 can include preventing launches if a sensor mechanism is determined to be out of specification (e.g., excess payload).

Figure 4:
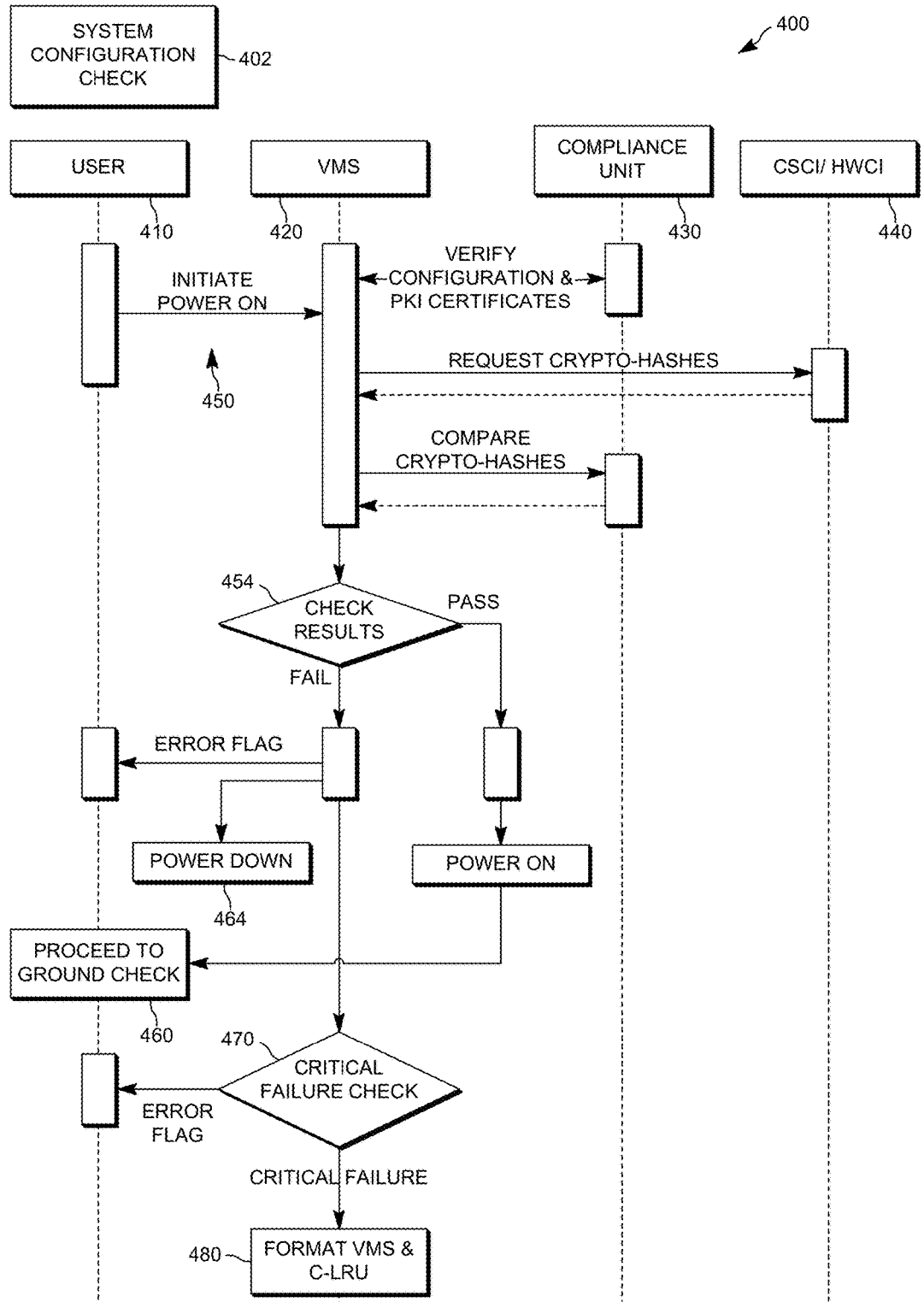
FIG. 4 illustrates an example method for system configuration checking to facilitate compliance with intended use of an unmanned vehicle.

In view of the foregoing structural and functional features described above, example methods will be better appreciated with reference to FIGS. 4 though 9. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by various components configured in an IC or a controller, for example.

FIG. 4 illustrates an example method 400 for system configuration checking to facilitate compliance with intended use of an unmanned vehicle (UV). The method 400 includes initial system checking 402 that occurs before (or during) other methods as described herein are executed. This includes communications between a user 410 (e.g., at ground control station), a vehicle management system 420 (VMS), a compliance unit 430, and component 440 having a hardware configuration item (HWCI) and a computer software configuration item (CSCI), where configuration items are components (e.g., system performance thresholds, sensor thresholds) used to verify compliance of the UV. At 450 of the method 400, power on is issued. At 454 of method 400, system configuration 420 checks HWCI/CSCI Crypto-Hashes at 440 and compares to expected values. This is sent over an encrypted channel, for example. If the crypto-hashes match the configuration file in the compliance unit 430, the UV proceeds to Ground Check at 460. If the check at 454 fails, it flags an error and is shut down at 464. If there are server discrepancies between versions detected at 470, a critical failure flag can be called and the VMS 420 and the compliance unit 430 are formatted at 480.

Figure 5:
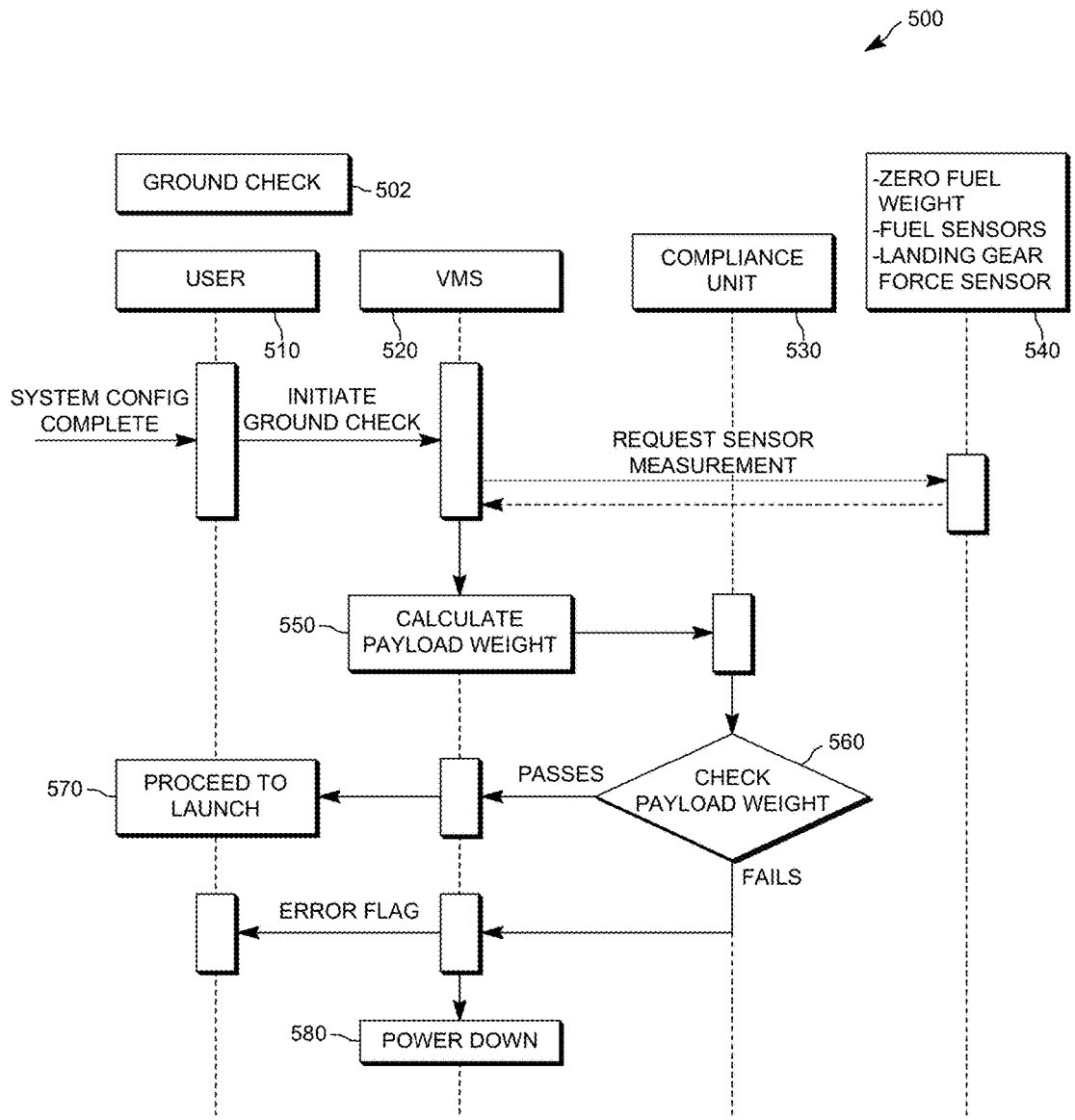
FIG. 5 illustrates an example method for ground checking to facilitate compliance with intended use of an unmanned vehicle.

FIG. 5 illustrates an example method 500 for ground checking to facilitate compliance with intended use of an unmanned vehicle. The method 500 includes ground checking 502 that occurs before (or during) other methods as described herein are executed. This includes communications between a user 510 (e.g., at ground control station), a vehicle management system 520 (VMS), a compliance unit 530, and sensors 540 which can include fuel sensors, force sensors, landing sensors, and so forth. The ground check 502 uses strain gauges, transmission sensors, and so forth to measure weight in multiple areas. At 550 of the method 500, payload weight can be calculated as: GW1=AG1+FG1, GW2=AG2+FG2, where GW=(GW1+GW2)/2 and AG is an aft gauge and FG is a forward gauge (See e.g., FIG. 3). Another parameter can be calculated as Xcg1=73.0+ ((82.2*AG1)/(AG1+FG1)) and Xcg2=73.0+((82.2*AG2)/ (AG2+FG2)). Thus, payload weight (Wp)=GW–Fuel Weight (Wf)–Zero Fuel Weight (Ws). Weight is verified for compliance/non-compliance at 560 and checks to if GW1 and GW2 match within 5% (or other tolerance), and if GW1 and GW2 are both<6000 lbs (YES=CONTINUE, NO=SHUTDOWN/return to base (RTB)) Another check at 560 is fuel weight; if Xcg1 and Xcg2 match CG table @ this fuel weight +/– 2.0 Inches? (YES=Continue, NO=Normal Shutdown). Another check at 560 is Wp<1000 lbs? (or other predetermined threshold) YES=LAUNCH at 570 NO=Normal Shutdown at 580 (e.g., provides 102 lb margin to 500 Kg Limit), after checking, the compliance unit 530 sends a coded message to software (or hardware) to either proceed with perch (e.g., method 600) or shutdown/RTB based on results from the compliance unit.

Figure 6:
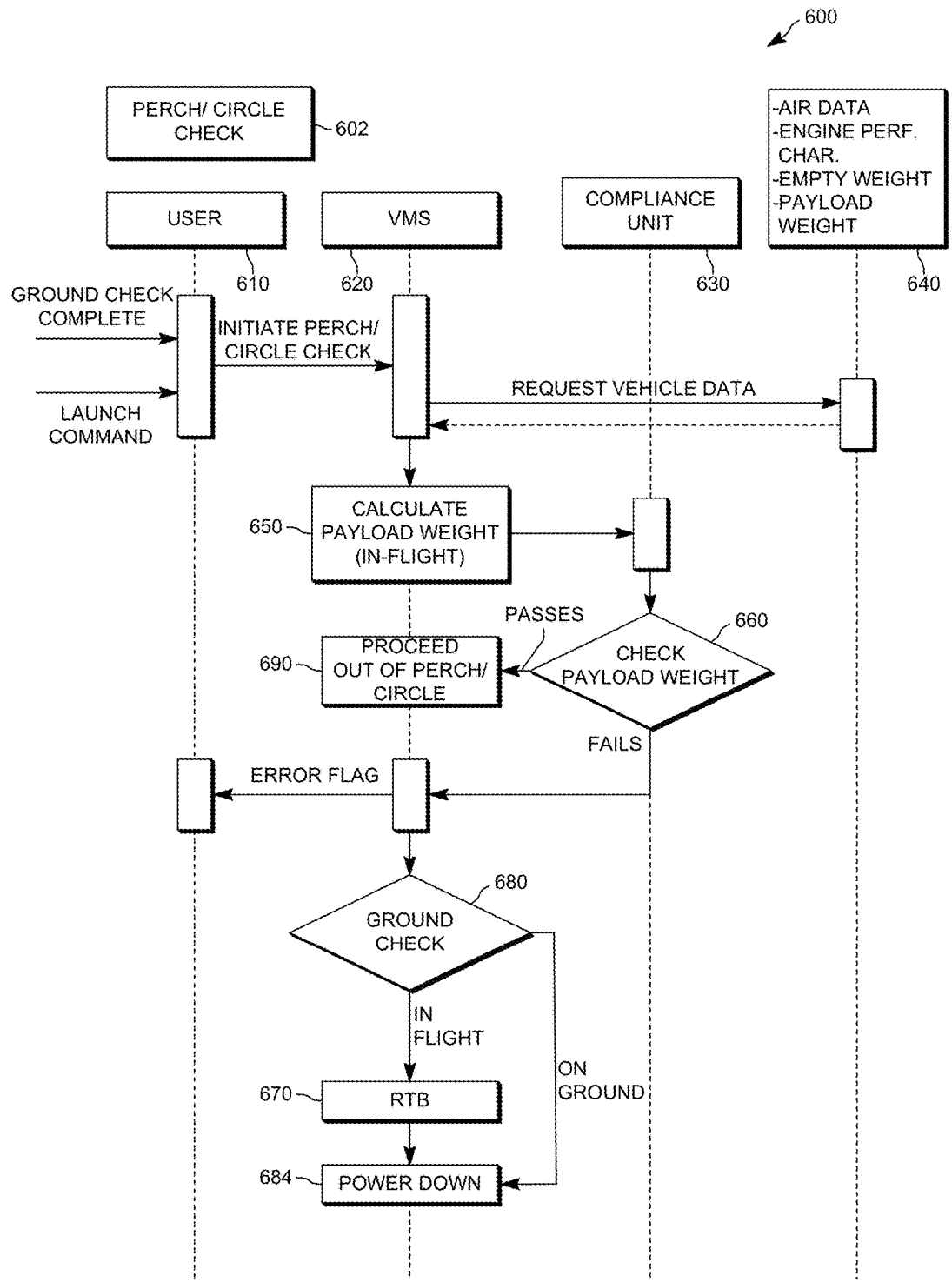
FIG. 6 illustrates an example method for perch checking to facilitate compliance with intended use of an unmanned vehicle.

FIG. 6 illustrates an example method 600 for perch checking to facilitate compliance with intended use of an unmanned vehicle. As used herein, the term perch checking includes checking whether the vehicle has added payload after flight has begun (e.g., via a loop attached to a helicopter to pick up an item). The method 600 includes perch checking 602 that occurs before, during, or after other methods as described herein are executed. This includes communications between a user 610 (e.g., at ground control station), a vehicle management system 620 (VMS), a compliance unit 630, and component 640 to determine air data, engine performance, empty weight characteristics, payload weight, and so forth. The Perch check 602 uses Air Data, Engine Performance Characteristics, zero weight, and payload weight from component 640 to calculate payload weight in air at 650. If the weight is more than what is allowed as determined at 660, then an error is flagged and the vehicle is commanded to return to base (RTB) 670 where further ground checking can occur at 680 before powering down at 684. If perch checking passes at 660, the vehicle proceeds to flight checking (See method 700) at 690.

Figure 7:
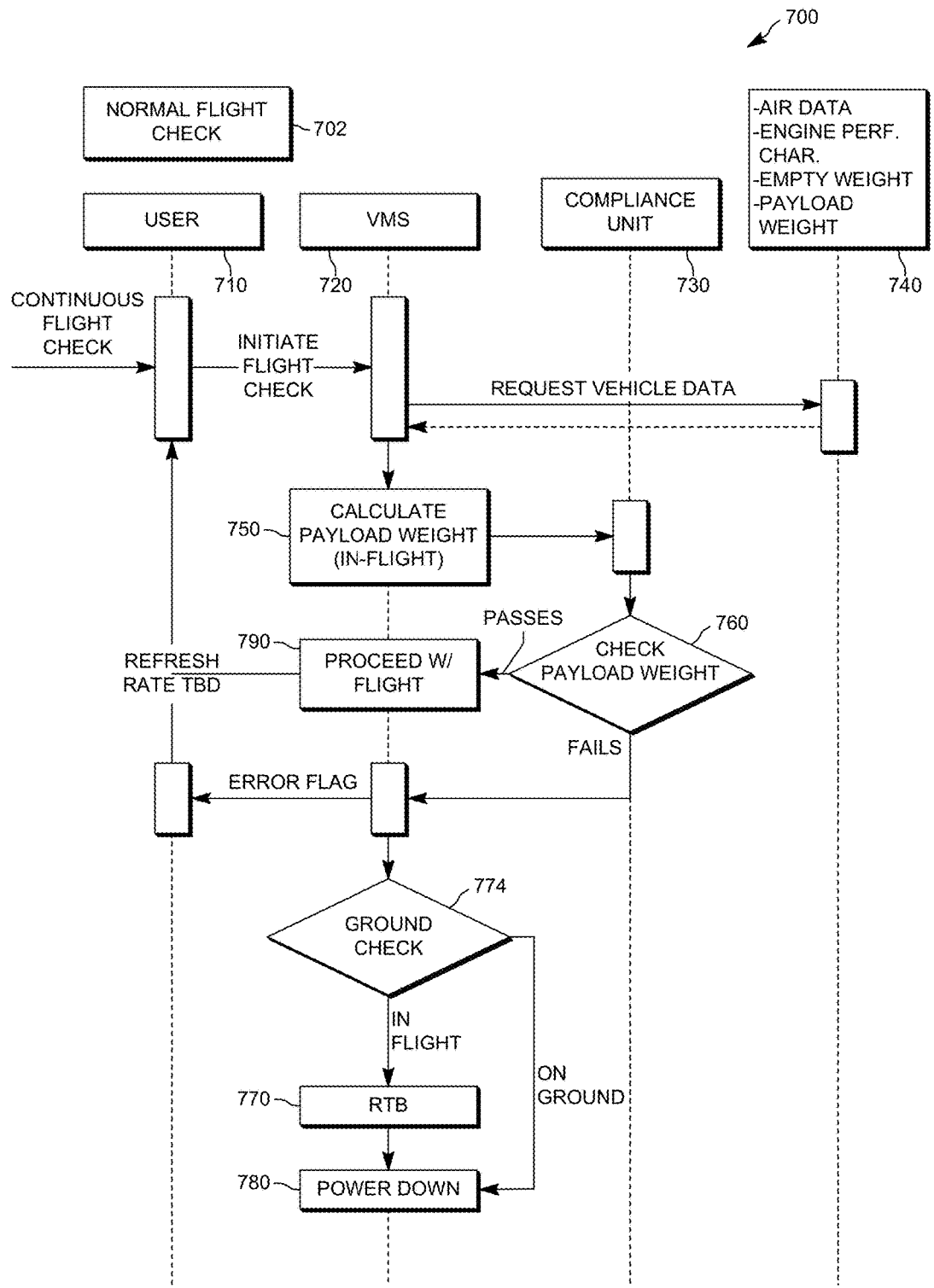
FIG. 7 illustrates an example method for flight checking to facilitate compliance with intended use of an unmanned vehicle.

FIG. 7 illustrates an example method 700 for flight checking to facilitate compliance with intended use of an unmanned vehicle. The method 700 includes flight checking 702 that occurs before, during, or after other methods as described herein are executed. This includes communications between a user 710 (e.g., at ground control station), a vehicle management system 720 (VMS), a compliance unit 730, and component 740 to determine air data, engine performance, empty weight characteristics, payload weight, and so forth. Flight checking 702 can use the same data 740 as perch checking to continuously (or substantially continuous) calculate the weight of the payload throughout the flight at 750. If there is a discrepancy in the weight at 760, the vehicle is commanded to RTB at 770, where further ground checking can occur at 774 before powering down at 780. If the flight check passes at 760, the UV proceeds with its flight at 790.

Figure 8:
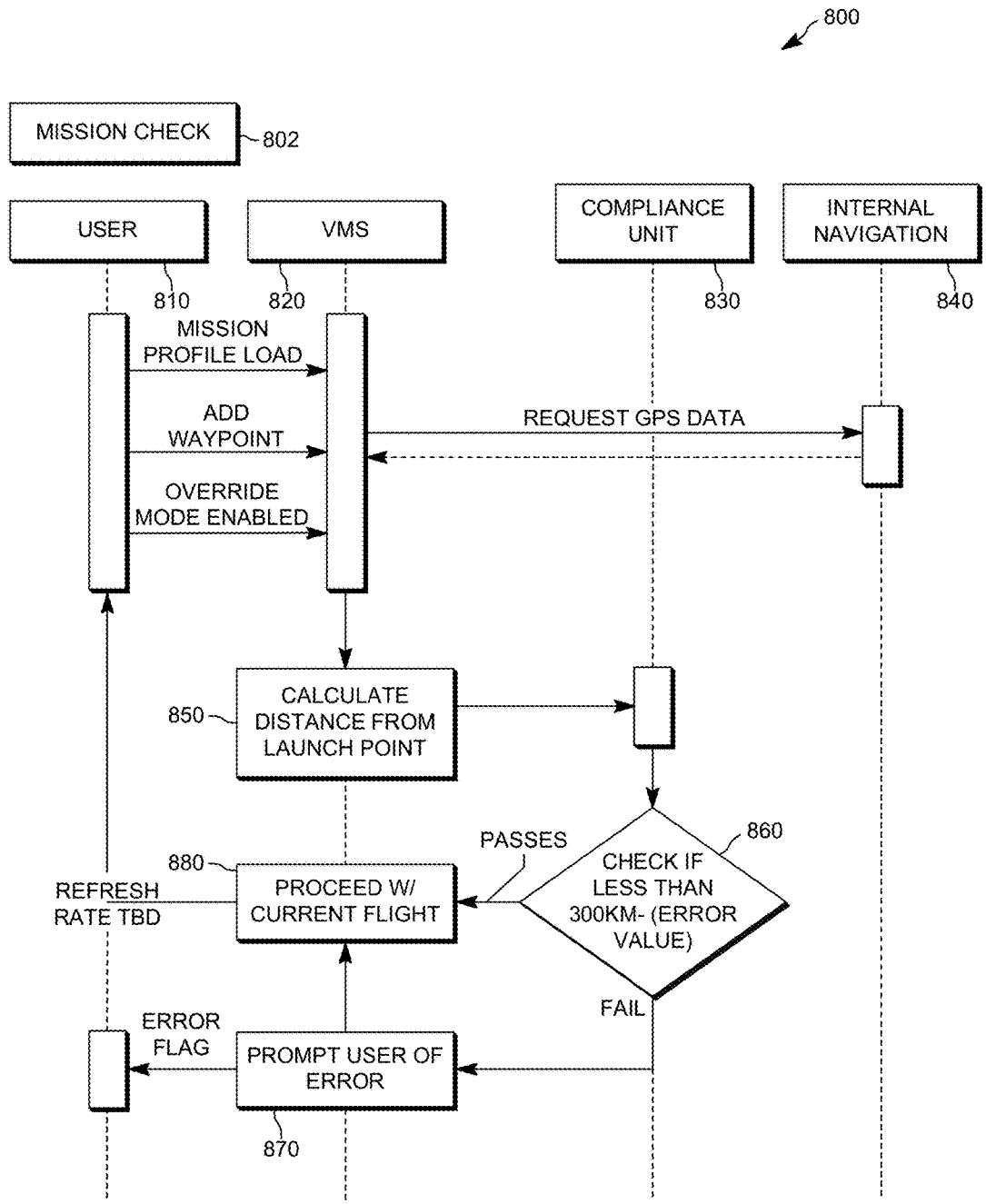
FIG. 8 illustrates an example method for mission checking to facilitate compliance with intended use of an unmanned vehicle.

FIG. 8 illustrates an example method 800 for mission checking to facilitate compliance with intended use of an unmanned vehicle. The method 800 includes mission checking 802 that occurs before, during, or after other methods as described herein are executed. This includes communications between a user 810 (e.g., at ground control station), a vehicle management system 820 (VMS), a compliance unit 830, and an internal navigation unit 840. Mission checking 802 prevents the vehicle from flying outside of the bounds to be enforced. This uses internal navigation global positioning system (GPS) to calculate the distance from the current position back to the launch point at 850. This is checked at 860 each time a mission profile is loaded, a waypoint is added, or continuously while override mode is commanded. If the user enters a waypoint or mission profile that is outside of the limitation bounds (e.g., mission has flown greater than a predetermined flight distance), an error is thrown and the command is not accepted 870. As long as the mission is within the acceptable range, the flight proceeds normally at 880.

Figure 9:
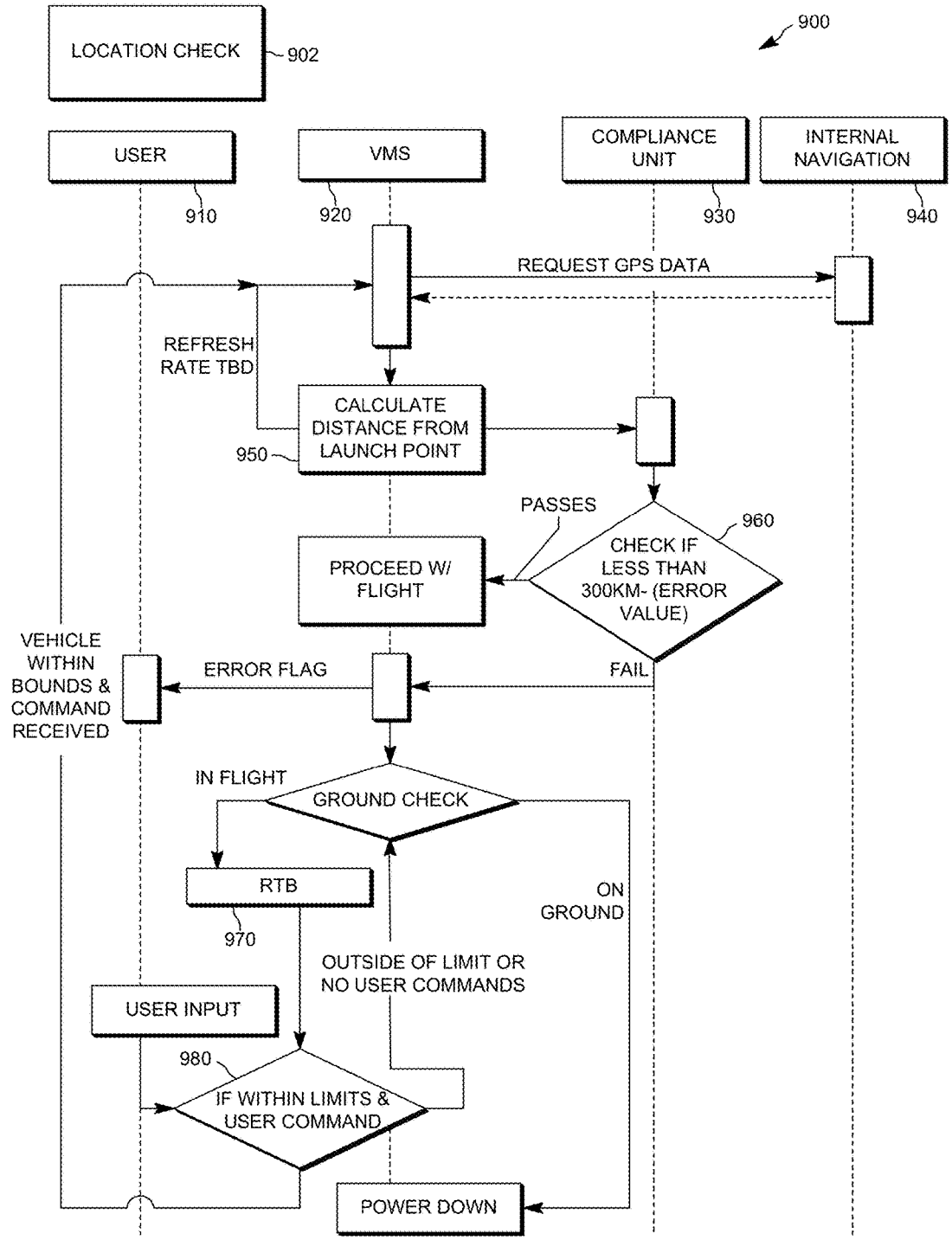
FIG. 9 illustrates an example method for location checking to facilitate compliance with intended use of an unmanned vehicle.

FIG. 9 illustrates an example method 900 for location checking to facilitate compliance with intended use of an unmanned vehicle. The method 600 includes location checking 902 that occurs, before, during, or after other methods as described herein are executed. This includes communications between a user 910 (e.g., at ground control station), a vehicle management system 920 (VMS), a compliance unit 930, and an internal navigation unit 940. Location checking 902 calculates the distance between the launch point and the current vehicle location at 950. It uses this to calculate whether the vehicle is outside of the bounds to be enforced upon it. If it reaches the limit as determined at 960, it is commanded to return to base (RTB) at 970. The user may continue to command the vehicle once it is within the limitation bounds at 980. If no user input, the vehicle will return to base at 970.

Figure 10:
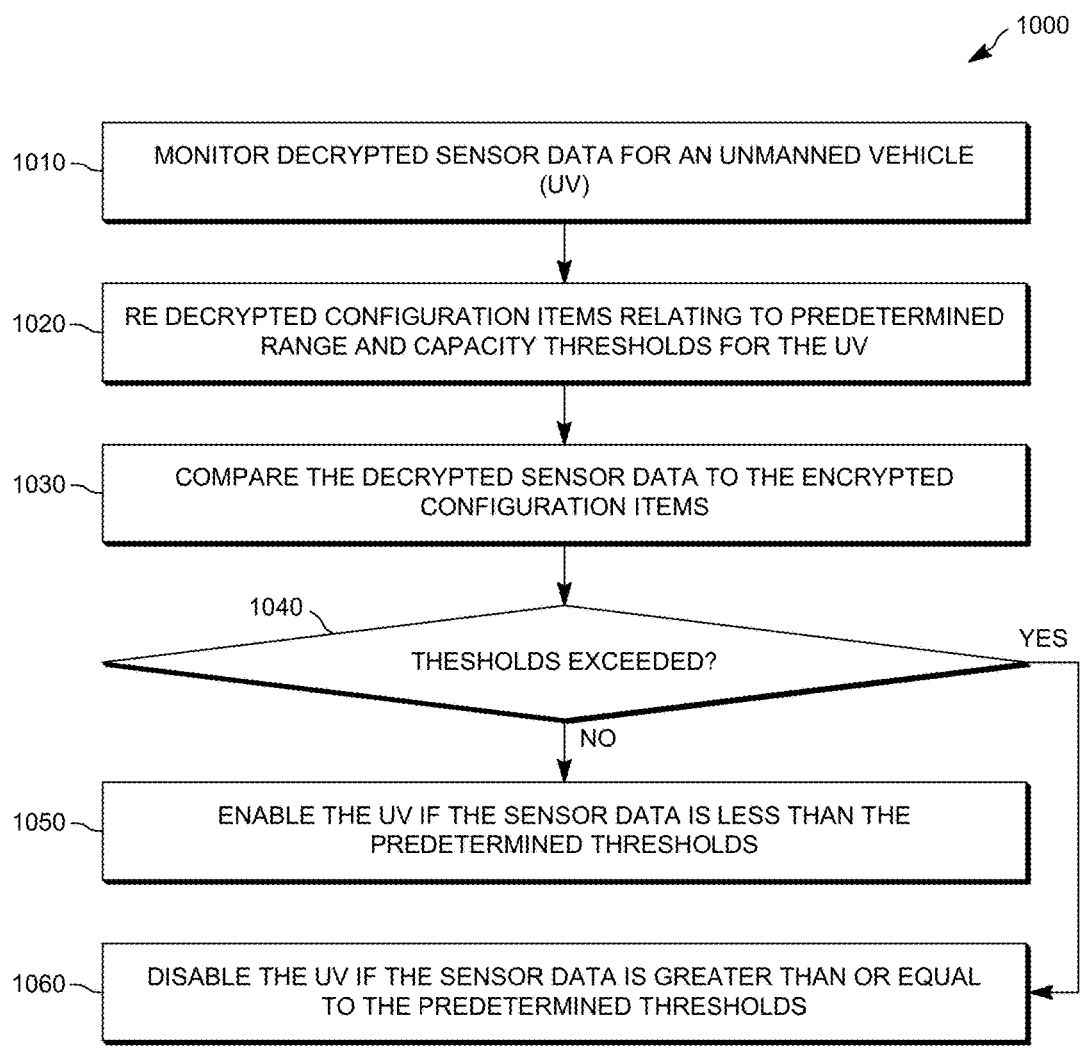
FIG. 10 illustrates an example of a method to dynamically monitor unmanned vehicle performance to facilitate compliance with intended use of the vehicle.

FIG. 10 illustrates an example of a method 1000 to dynamically monitor unmanned vehicle performance to facilitate compliance with intended use of the vehicle. At 1010, the method 1000 includes monitoring decrypted sensor data for an unmanned vehicle (UV) (e.g., via VMS 110 and compliance unit 120 of FIG. 1). The decrypted sensor data includes at least one of fuel sensor data, strain data, air speed data, and engine performance data. At 1020, the method 1000 includes receiving decrypted configuration items relating to predetermined range and capacity thresholds for the UV (e.g., via VMS 110, router 130, and compliance unit 120 of FIG. 1). At 1030, the method 1000 includes comparing the decrypted sensor data to the decrypted configuration items to determine if the sensor data exceeds the predetermined range and capacity thresholds (e.g., via compliance unit 120 of FIG. 1). At 1040, a determination is made as to whether or not the thresholds were exceeded due to the comparison at 1030. If the thresholds are not exceeded at 1040, the method 1000 includes enabling the UV at 1050 if the sensor data is less than the predetermined thresholds (e.g., via enable command sent from compliance unit 120 of FIG. 1). If the thresholds are exceeded at 1040, the method 1000 includes disabling the UV at 1060 if the sensor data is greater than or equal to the predetermined thresholds (e.g., via disable command sent from compliance unit 120 of FIG. 1). Although not shown, the method 1000 can include all or portions of the methods previously disclosed relating to FIGS. 4 though 9. For example, the method 1000 can include performing a perch check to detect compliance with the predetermined range and capacity thresholds during execution of a mission by the UV.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
an unmanned vehicle (UV); and
a compliance unit that receives sensor data from one or more sensors and compares the sensor data to a predetermined payload capacity threshold and a predetermined range capability threshold to determine compliance with a predetermined payload capacity and a predetermined range capability of the UV, the compliance unit generates a command to restrict the operation of the UV if the sensor data exceeds the predetermined payload capacity threshold and the predetermined range capability threshold of the UV, the compliance unit including a perch check module to detect if the predetermined payload capacity has been exceeded after a flight has begun and throughout the flight of the UV.

2. The system of claim 1, wherein the compliance unit receives data from at least one strain gauge to determine compliance with the predetermined payload capacity and receives data from at least one fuel sensor to determine compliance with the range capability the UV.

3. The system of claim 2, wherein the compliance unit receives the sensor data in an encrypted format from the at least one strain gauge and the at least one fuel sensor to determine compliance.

4. The system of claim 1, further comprising a vehicle management system to control operations of the UV, the vehicle management system (VMS) directs the UV on a mission in response to an enable command from the compliance unit indicating that the respective predetermined thresholds are not exceeded.

5. The system of claim 4, wherein the compliance unit sends a disable command to the VMS to prevent a launch or shut down the UV if the predetermined payload capacity or the predetermined range capability has exceeded the respective predetermined thresholds.

6. The system of claim 4, further comprising a router that passes encrypted configuration items to the VMS that are checked against the respective predetermined thresholds in the compliance unit.

7. The system of claim 6, wherein the router receives global position data from an internal navigation unit that is passed to the compliance unit via the VMS as location data to further check compliance with the predetermined range capability of the UV.

8. The system of claim 4, wherein the VMS receives data from at least one of a zero weight sensor, a landing force sensor, an air data sensor, and an engine performance sensor that is passed to the compliance unit to determine whether the respective predetermined thresholds are exceeded.

9. The system of claim 1, wherein the perch check module monitors at least one of air data, engine performance characteristics, and zero weight data to calculate payload weight to detect whether the predetermined payload capacity has been exceeded throughout the flight of the UV.

10. An unmanned vehicle (UV), comprising:
a vehicle management system (VMS) to control operations of the UV, the VMS receives encrypted configuration items that specify threshold data relating to a payload capacity and a range capability of the UV, the threshold data includes a predetermined payload capacity threshold and a predetermined range capability threshold of the UV; and
a compliance unit that controls compliance of the UV to a predetermined payload capacity and a predetermined range capability of the UV, the compliance unit monitors sensor data from one or more sensors and compares the sensor data to a predetermined payload capacity threshold and a predetermined range capability threshold to determine compliance with the predetermined payload capacity and the predetermined range capability of the UV, the compliance unit notifies the VMS to restrict the operation of the UV if the sensor data exceeds the predetermined payload capacity threshold and the predetermined range capability threshold of the UV, the compliance unit including a perch check module to detect if the predetermined payload capacity has been exceeded after a flight has begun and throughout the flight of the UV.

11. The unmanned vehicle of claim 10, wherein the compliance unit receives data from at least one strain gauge to determine compliance with the predetermined payload capacity and receives data from at least one fuel sensor to determine compliance with the range capability of the UV.

12. The unmanned vehicle of claim 10, wherein the compliance unit sends a disable command to the VMS to prevent a launch or shut down the UV if the predetermined payload capacity or the predetermined range capability has exceeded the respective predetermined thresholds.

13. The unmanned vehicle of claim 10, further comprising a router that passes encrypted configuration items to the VMS that are checked against the respective predetermined thresholds in the compliance unit.

14. The unmanned vehicle of claim 13, wherein the router receives global position data from an internal navigation unit that is passed to the compliance unit via the VMS as location data to further check compliance with the predetermined range capability of the UV.

15. The unmanned vehicle of claim 10, wherein the perch check module monitors at least one of air data, engine performance characteristics, and zero weight data to calculate payload to detect whether the predetermined payload capacity has been exceeded throughout the flight of the UV.

16. The unmanned vehicle of claim 10, wherein the VMS receives data from at least one of a zero weight sensor, a landing force sensor, an air data sensor, and an engine performance sensor that is passed to the compliance unit to determine whether the respective predetermined thresholds are exceeded.

17. A method, comprising:
monitoring decrypted sensor data, via a controller, for an unmanned vehicle (UV), the decrypted sensor data includes at least one of fuel sensor data, strain data, air speed data, and engine performance data that indicate a payload capacity and a range capability of the UV;
receiving decrypted configuration items, via the controller, relating to a predetermined range threshold and a predetermined capacity threshold for the UV;
comparing the decrypted sensor data to the predetermined range threshold and the predetermined capacity threshold of the UV, via the controller, to determine if the sensor data exceeds the thresholds;
enabling the UV, via the controller, if the sensor data indicates payload capacity and range capability of the UV that is less than the predetermined thresholds;
disabling the UV, via the controller, if the sensor data indicates payload capacity and range capability of the UV that is greater than or equal to the predetermined thresholds; and
performing a perch check to detect compliance with the predetermined range and capacity thresholds after a flight has begun and throughout the flight of the UV.

* * * * *